(12) United States Patent
Hayashi et al.

(10) Patent No.: US 11,817,797 B2
(45) Date of Patent: Nov. 14, 2023

(54) DC-AC CONVERTER WITH INRUSH CURRENT SUPPRESSION

(71) Applicant: TOSHIBA MITSUBISHI-ELECTRIC INDUSTRIAL SYSTEMS CORPORATION, Chuo-ku (JP)

(72) Inventors: Yousuke Hayashi, Chuo-ku (JP); Kazunori Sanada, Chuo-ku (JP)

(73) Assignee: TOSHIBA MITSUBISHI-ELECTRIC INDUSTRIAL SYSTEMS, CORPORATION Chuo-ku (JP)

( * ) Notice: Subject to any disclaimer, the term of this patent is extended or adjusted under 35 U.S.C. 154(b) by 238 days.

(21) Appl. No.: 17/420,261

(22) PCT Filed: Aug. 20, 2019

(86) PCT No.: PCT/JP2019/032466
§ 371 (c)(1),
(2) Date: Jul. 1, 2021

(87) PCT Pub. No.: WO2021/033267
PCT Pub. Date: Feb. 25, 2021

(65) Prior Publication Data
US 2022/0085734 A1      Mar. 17, 2022

(51) Int. Cl.
*H02M 7/5395* (2006.01)
(52) U.S. Cl.
CPC .................................. *H02M 7/5395* (2013.01)
(58) Field of Classification Search
CPC .. H02M 7/539; H02M 7/5395; H02M 7/5387; H02M 7/53871; H02M 1/32; H02M 7/4803
See application file for complete search history.

(56) References Cited

U.S. PATENT DOCUMENTS

| 4,823,251 A | 4/1989 | Kawabata et al. |
| 4,947,310 A | 8/1990 | Kawabata et al. |

(Continued)

FOREIGN PATENT DOCUMENTS

| JP | 2005-27418 A | 1/2005 |
| JP | 2018-207785 A | 12/2018 |

OTHER PUBLICATIONS

Indian Office Action dated Mar. 22, 2022, in Indian Patent Application No. 202117030987 (with English translation), 4 pages.

(Continued)

*Primary Examiner* — Alex Torres-Rivera
(74) *Attorney, Agent, or Firm* — Oblon, McClelland, Maier & Neustadt, L.L.P.

(57) ABSTRACT

A voltage controller generates an AC current command value by adding a feed-forward term to a result of a control calculation performed for reducing a difference of a detected value of an AC voltage with respect to an AC voltage command value, the feed-forward term being determined by multiplying, by a gain, a detected value of primary winding current of a transformer. A current controller generates an inverter control command value by a control calculation performed for reducing a difference of a detected value of output current of the inverter with respect to the AC current command value. A PWM circuit generates a control signal for the inverter by comparing the inverter control command value with a predetermined carrier wave. When exciting inrush current is detected in a detected value of the primary winding current, the voltage controller sets the gain smaller than the gain when the exciting inrush current is not detected.

5 Claims, 5 Drawing Sheets

(56) References Cited

U.S. PATENT DOCUMENTS

| | | | | |
|---|---|---|---|---|
| 2006/0245221 | A1* | 11/2006 | Ohshima | H02M 7/53871 363/131 |
| 2015/0002067 | A1* | 1/2015 | Nondahl | H02P 21/00 318/503 |
| 2016/0329850 | A1* | 11/2016 | Mori | B62D 5/046 |
| 2019/0190402 | A1* | 6/2019 | Kamatani | H02M 7/53871 |

OTHER PUBLICATIONS

International Search Report dated Oct. 29, 2019 in PCT/JP2019/032466 filed on Aug. 20, 2019, 1 page.

* cited by examiner

DC-AC CONVERTER WITH INRUSH CURRENT SUPPRESSION

TECHNICAL FIELD

The present invention relates to a power converter.

BACKGROUND ART

Japanese Patent Laying-Open No. 2018-207785 (PTL 1) discloses a power converter including an inverter for converting a DC voltage to an AC voltage, a transformer disposed between the inverter and a load, and a controller for controlling the inverter. According to PTL 1, a biased-magnetization detection circuit is used to detect a DC component included in the output voltage of the inverter, and the waveform of the output voltage of the inverter is controlled so that the detected DC component is eliminated. The biased-magnetization detection circuit includes an integrator for integrating the output voltage of the inverter, and is configured to detect a DC component in an output signal of the integrator.

CITATION LIST

Patent Literature

PTL 1: Japanese Patent Laying-Open No. 2018-207785

SUMMARY OF INVENTION

Technical Problem

When the inverter is connected to the transformer in the above-referenced power converter, exciting inrush current may be generated in the transformer depending on the phase of the AC voltage. The exciting inrush current may cause transient variations of the voltage supplied to the load and cause the load to malfunction.

The biased-magnetization detection circuit disclosed in PTL 1, however, detects DC-biased magnetization in the core of the transformer based on an output signal of the integrator for controlling the inverter, and may therefore not be able to immediately suppress exciting inrush current that instantaneously occurs upon connection of the inverter to the transformer.

The present invention has been made to solve such a problem. An object of the present invention is to provide a power converter capable of suppressing exciting inrush current that is generated when the inverter is connected to the transformer.

Solution to Problem

According to an aspect of the present invention, a power converter includes an inverter that converts a DC voltage at a DC side to an AC voltage and outputs the AC voltage from an AC side, and a controller that controls the inverter. The AC side of the inverter is connected to a load via a transformer. The transformer supplies, to the load, the AC voltage that is output from the AC side. The power converter further includes: a first current detector that detects primary winding current of the transformer; a second current detector that detects output current of the inverter; and a voltage detector that detects the AC voltage that is output from the AC side. The controller includes a voltage control unit, a current control unit, and a PWM circuit. The voltage control unit generates an AC current command value by adding a feed-forward term to a result of a control calculation that is performed for reducing a difference of a value of the AC voltage detected by the voltage detector, with respect to an AC voltage command value, the feed-forward term being determined by multiplying, by a gain, a value of the primary winding current detected by the first current detector. The current control unit generates an inverter control command value by a control calculation that is performed for reducing a difference of a value of the output current of the inverter detected by the second current detector, with respect to the AC current command value. The PWM circuit performs PWM control of the inverter by comparing the inverter control command value with a predetermined carrier wave to generate a control signal for the inverter. When exciting inrush current is detected in a value of the primary winding current detected by the first current detector, the voltage control unit sets the gain smaller than the gain when the exciting inrush current is not detected.

Advantageous Effects of Invention

According to the present invention, a power converter capable of suppressing exciting inrush current that is generated when the inverter is connected to the transformer can be provided.

DESCRIPTION OF EMBODIMENTS

Figure 1:
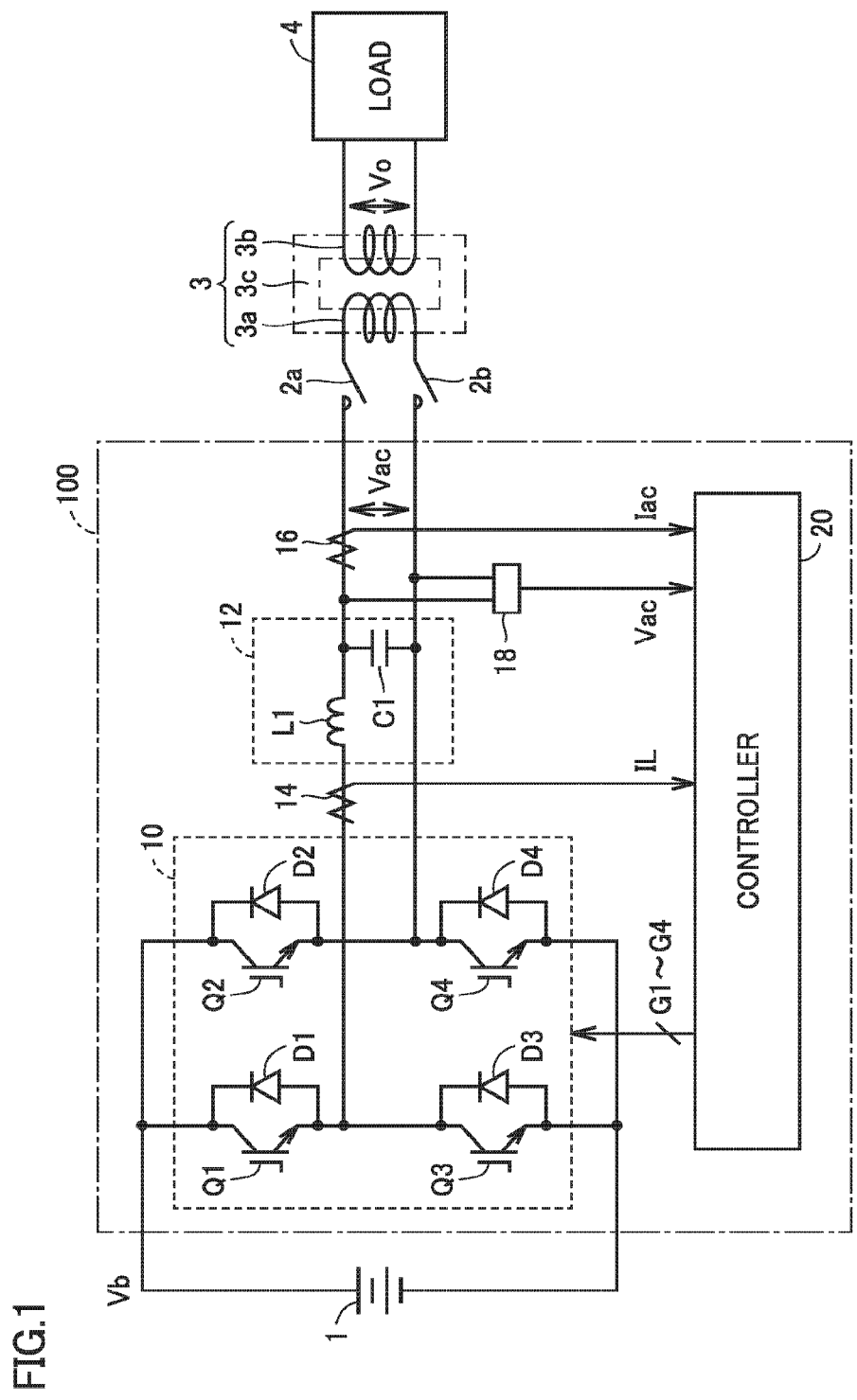
FIG. 1 is a schematic configuration diagram of a power converter according to an embodiment.

In the following, embodiments of the present invention are described in detail with reference to the drawings. In the drawings, the same or corresponding parts are denoted by the same reference characters, and a description thereof is not repeated.

FIG. 1 is a schematic configuration diagram of a power converter according to an embodiment.

Referring to FIG. 1, a DC power supply 1 is connected to a DC side of a power converter 100 according to the embodiment. A load 4 is connected to an AC side of power converter 100 via breakers 2a, 2b and a transformer 3. Transformer 3 includes a primary winding 3a, a secondary winding 3b, and an annular core 3c.

Power converter 100 includes an inverter 10, an output filter 12, current detectors 14, 16, a voltage detector 18, and a controller 20. Inverter 10 is controlled by control signals G1 to G4 that are supplied from controller 20 to convert DC voltage Vb of DC power supply 1 to AC voltage Vinv.

Specifically, inverter 10 includes power semiconductor switching devices (hereinafter also referred to simply as "switching device(s)") Q1 to Q4. Switching devices Q1 to Q4 are each an IGBT (Insulated Gate Bipolar Transistor), for example. Respective collectors of switching devices Q1, Q2 are both connected to the positive electrode of DC power supply 1. Respective collectors of switching devices Q3, Q4 are connected to respective emitters of switching devices Q1, Q2, respectively. Respective emitters of semiconductor switching devices Q3, Q4 are both connected to the negative electrode of DC power supply 1.

While the IGBT is used as the switching device in FIG. 1, any self arc-extinguishing type switching device such as MOSFET (Metal Oxide Semiconductor Field Effect Transistor) may be used as the switching device. Diodes D1 to D4 are connected in anti-parallel with switching devices Q1 to Q4, respectively. Each of diodes D1 to D4 is arranged for allowing freewheeling current to flow when the associated switching device is turned off. If the switching device is a MOSFET, the freewheeling diode is configured as a parasitic diode (body diode). If the switching device is an IGBT with no diode contained, the freewheeling diode is configured as a diode connected in anti-parallel with the IGBT.

Electrical conduction (ON)/electrical non-conduction (OFF) of switching devices Q1 to Q4 is controlled by control signals G1 to G4 respectively supplied from controller 20. Control signals G1 to G4 are each a PWM (Pulse Width Modulation) control signal, for example. A period of each of control signals G1 to G4 is the reciprocal of a switching frequency. Control signals G1 to G4 are each set to H (logical high) level or L (logical low) level in each cycle. Switching devices Q1 to Q4 are each turned on when the associated control signal is set to H level, and turned off when the associated control signal is set to L level.

Output filter 12 includes a reactor L1 and a capacitor C1. One terminal of reactor L1 is connected to the emitter of switching device Q1. The other terminal of reactor L1 is connected to one terminal of primary winding 3a in transformer 3 via breaker 2a. The emitter of switching device Q2 is connected to the other terminal of primary winding 3a in transformer 3 via breaker 2b. Capacitor C1 is connected between one terminal and the other terminal of primary winding 3a.

Output filter 12 forms a low-pass filter, passes AC power of a desired frequency (commercial frequency, for example) generated by switching devices Q1 to Q4, and prevents a signal of a switching frequency generated by switching devices Q1 to Q4 from being passed to load 4. In other words, output filter 12 converts AC voltage Vinv in a rectangular waveform generated by turning on/off switching devices Q1 to Q4, to AC voltage Vac in a sinusoidal waveform.

Transformer 3 supplies, to load 4, AC voltage Vo corresponding to AC voltage Vac that is output from output filter 12. The ratio between the amplitude of AC voltage Vac and the amplitude of AC voltage Vo is equal to ratio N1/N2 between the number of turns N1 of primary winding 3a and the number of turns N2 of secondary winding 3b.

Load 4 is driven by AC voltage Vo supplied from transformer 3. Breakers 2a, 2b can be arranged between output filter 12 and transformer 3 to control connection and disconnection between power converter 100 and transformer 3.

Current detector 14 detects reactor current IL of reactor L1 in output filter 12. Reactor current IL corresponds to "AC current" that is output from an AC side of inverter 10. Current detector 16 detects AC current Iac that is output from output filter 12. AC current Iac corresponds to "primary winding current" flowing in primary winding 3a of transformer 3. Current detector 14 corresponds to an example of "second current detector" and current detector 16 corresponds to an example of "first current detector."

Voltage detector 18 detects voltage Vac of capacitor C1 in output filter 12. Voltage Vac of capacitor C1 corresponds to "AC voltage" of the AC side of inverter 10. Respective detected values of reactor current IL, primary winding current Iac and voltage Vac are input to controller 20. Voltage detector 18 corresponds to an example of "voltage detector."

Using the detected values of primary winding current Iac, reactor current IL and voltage Vac, controller 20 generates control signals G1 to G4 for controlling ON and OFF of semiconductor switching devices Q1 to Q4.

Next, a control configuration of power converter 100 shown in FIG. 1 is described. Initially, a control configuration of a power converter according to a comparative example is described.

Figure 2:
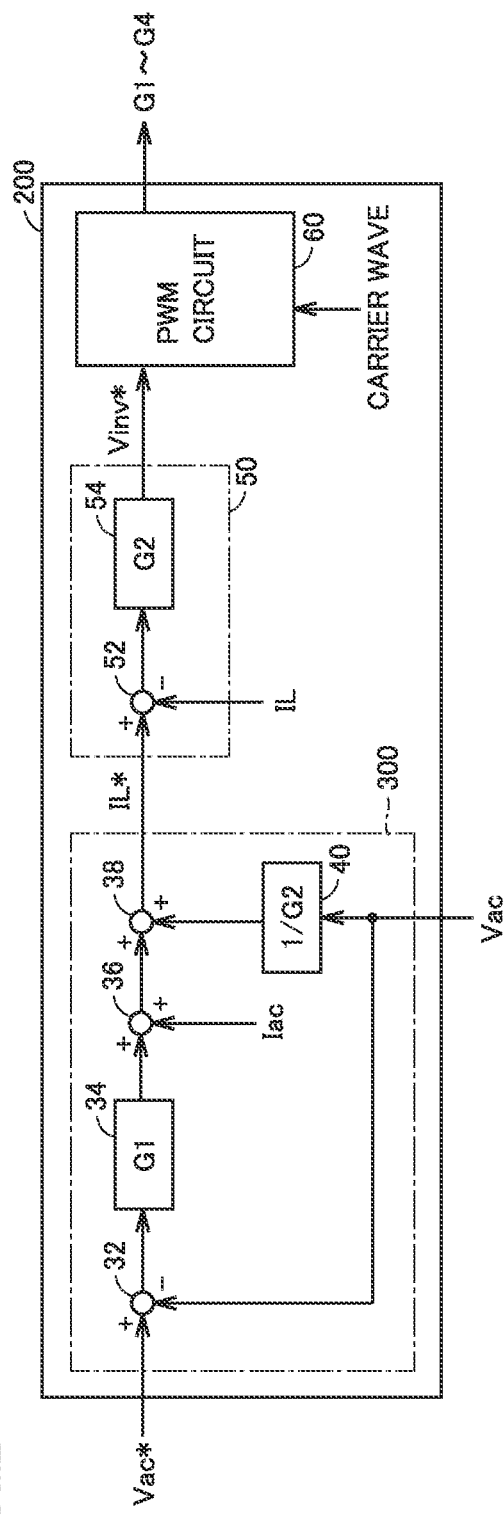
FIG. 2 is a functional block diagram illustrating a control configuration of a power converter according to a comparative example.

FIG. 2 is a functional block diagram illustrating a control configuration of a power converter according to a comparative example.

Referring to FIG. 2, a controller 200 of the power converter according to the comparative example includes a voltage control unit 300, a current control unit 50, and a PWM circuit 60.

Voltage control unit 300 includes a subtractor 32, a voltage controller 34, adders 36, 38, and a gain calculator 40. Subtractor 32 calculates difference ΔVac of voltage Vac detected by voltage detector 18, with respect to voltage command value Vac* for capacitor C1. Voltage command value Vac* is set to a sinusoidal voltage of a desired frequency (commercial frequency, for example). Voltage command value Vac* corresponds to "AC voltage command value."

Voltage controller 34 generates an inverter control command value by a control calculation for reducing difference ΔVac calculated by subtractor 32. The inverter control command value corresponds to a command value for AC current that is output from the AC side of inverter 10. Gain G1 refers to a gain for the control calculation performed by voltage controller 34. For example, voltage controller 34 can determine the inverter control command value by a feedback calculation that adds a proportional term (Kp·ΔVac) determined by multiplying difference ΔVac and proportional gain Kp and an integral term (Ki·Σ(ΔVac)) determined by multiplying the value of the integral of difference ΔVac and integral gain Ki.

Adder 36 adds, to the inverter control command value, primary winding current Iac detected by current detector 16 as a feed-forward term. The feed-forward term is added to the result of the aforementioned feedback calculation to thereby enable a current control system to speedily address a sudden change of primary winding current Iac.

Gain calculator 40 multiplies voltage Vac detected by voltage detector 18 and the reciprocal of gain G2 of a current controller 54 (the reciprocal=1/G2).

Adder 38 adds the output (Vac/G2) of gain calculator 40 to the output of adder 36 for voltage compensation to thereby generate reactor current command value IL*. Reactor current command value IL* corresponds to "AC current command value."

Current control unit 50 includes a subtractor 52 and current controller 54. Subtractor 52 calculates difference ΔIL of reactor current IL detected by current detector 14, with respect to reactor current command value IL*.

Current controller 54 generates inverter control command value Vinv* by a control calculation for reducing difference ΔIL calculated by subtractor 52. Inverter control command value Vinv* corresponds to a command value for output voltage Vinv of inverter 10. Gain G2 refers to a gain for the control calculation performed by current controller 54. For example, current controller 54 can determine inverter control command value Vinv* by a feedback calculation that adds a proportional term (Kp·ΔIL) determined by multiplying difference ΔIL and proportional gain Kp and an integral term (Ki·Σ(ΔIL)) determined by multiplying the value of the integral of difference ΔIL and integral gain Ki. As reactor current command value IL* periodically changes, inverter control command value Vinv* also has an AC waveform of the same frequency.

PWM circuit 60 generates control signals G1 to G4 for controlling inverter output voltage Vinv to have inverter control command value Vinv*. Specifically, PWM circuit 60 makes a voltage comparison between inverter control command value Vinv* and the carrier wave to generate PWM signals S1, S2. Basically, in a period of time in which Vinv* is lower than the voltage of the carrier wave, PWM signal S1 is set to H level and PWM signal S2 is set to L level. In contrast, in a period of time in which Vinv* is higher than the voltage of the carrier wave, PWM signal S1 is set to L level and PWM signal S2 is set to H level.

In the period of time in which PWM signal S1 is H level, control signals G1, G4 are set to H level for turning on semiconductor switching devices Q1, Q4. On the contrary, in the period of time in which PWM signal S1 is L level, control signals G1, G4 are set to L level for turning off semiconductor switching devices Q1, Q4.

In contrast, in a period of time in which PWM signal S2 is H level, control signals G2, G3 are set to H level for turning on semiconductor switching devices Q2, Q3. On the contrary, in a period of time in which PWM signal S2 is L level, control signals G2, G3 are set to L level for turning off semiconductor switching devices Q2, Q3. A dead time is provided between PWM signals S1 and S2.

In controller 200 according to the comparative example, voltage Vac detected by voltage detector 18, which is a feed-forward term to be added by current control unit 50, is substantially added to voltage control unit 300. In such a configuration, current control unit 50 may be of a lower-response design as compared with voltage control unit 300 and may be configured by digital control for example, which enables calculation by software. As a result, the circuit can be simplified and the cost can be reduced.

In the configuration example in FIG. 1, when both breakers 2a, 2b are closed to connect power converter 100 to transformer 3, exciting inrush current may be generated in transformer 3 depending on the phase of voltage Vac at the time when power converter 100 is connected to transformer 3. The exciting inrush current may cause transient variations of the voltage supplied to load 4 and cause load 4 to malfunction.

By integrating voltage Vac across the terminals of primary winding 3a, a magnetic flux generated in core 3c of transformer 3 is obtained. If the waveform of voltage Vac is an ideal sinusoidal waveform, the magnetic flux is a sinusoidal wave delayed by 90° from voltage Vac. When breakers 2a, 2b are closed at the position where voltage Vac is zero, the magnetic flux reaches its maximum value. If the magnetic flux remains in core 3c of transformer 2, the magnetic flux is a sinusoidal wave where the initial value is the remaining magnetic flux. The fact that the remaining flux is generated in core 3c of transformer 3 means that a DC component is superimposed on the magnetic flux density of core 3c (hereinafter also referred to as "DC-biased magnetization"). As the magnetic flux exceeds a magnetic saturation point of core 3c, the exciting impedance of transformer 3 is sharply decreased to cause large transient current (exciting inrush current) to flow. As a result, primary winding current Iac is increased sharply.

In controller 200 according to the comparative example shown in FIG. 2, voltage control unit 300 adds, to the result of the feedback calculation, primary winding current Iac detected by current detector 16 as a feed-forward term. Therefore, if the exciting inrush current is generated, primary winding current Iac makes a sudden change. Then, current control unit 50 speedily addresses the sudden change of primary winding current Iac. Accordingly, the exciting current increases, which may eventually increase the DC-biased magnetization.

As a technique for suppressing the DC-biased magnetization of transformer 3, PTL 1 for example discloses a configuration in which the biased-magnetization detection circuit is used to detect a DC component included in the inverter output voltage and the waveform of the inverter output voltage is controlled so that the detected DC component is eliminated. This biased-magnetization detection circuit includes the integrator for integrating the inverter output voltage, and is configured to detect a DC component in an output signal of the integrator.

As described above, however, the exciting inrush current is generated instantaneously at the time when power converter 100 is connected to transformer 3. The biased-magnetization detection circuit disclosed in PTL 1 detects the DC-biased magnetization in core 3c of transformer 3 based on the integrator output signal and controls the inverter. In this configuration, it is difficult to immediately suppress the exciting inrush current.

In view of this, in power converter 100 according to the present embodiment, controller 20 is configured to reduce the magnitude of the feed-forward term in the voltage control unit when exciting inrush current included in primary winding current Iac is detected.

Figure 3:
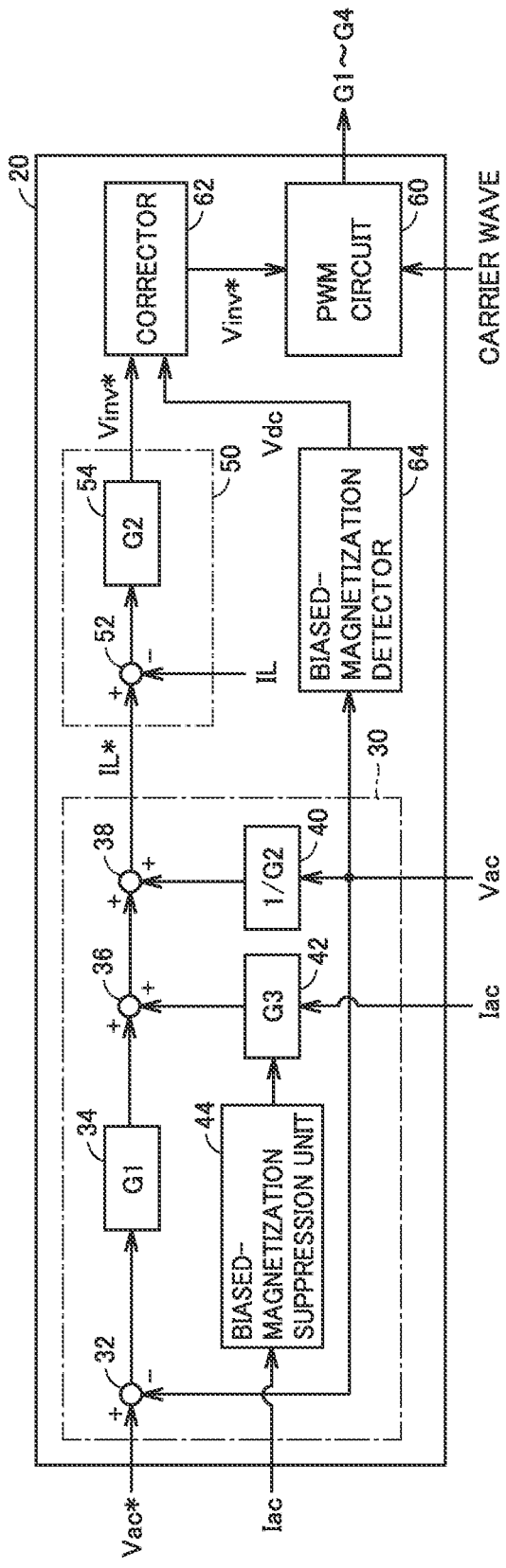
FIG. 3 is a functional block diagram illustrating an example of a control configuration of a power converter according to an embodiment.

FIG. 3 is a functional block diagram illustrating an example of the control configuration of power converter 100 according to the present embodiment. Each functional block forming a component of controller 20 is implemented through software processing and/or hardware processing by a microcomputer forming controller 20, for example.

Referring to FIG. 3, controller 20 includes a voltage control unit 30, a current control unit 50, and a PWM circuit 60. Controller 20 shown in FIG. 3 differs from controller 200 according to the comparative example shown in FIG. 2 in that the former includes voltage control unit 30 instead of voltage control unit 300.

Voltage control unit 30 includes a subtractor 32, a voltage controller 34, adders 36, 38, gain calculators 40, 42, and a biased-magnetization suppression unit 44. Voltage control unit 30 differs from voltage control unit 300 shown in FIG. 2 in that the former additionally includes gain calculator 42 and biased-magnetization suppression unit 44.

Gain calculator 42 multiplies primary winding current Iac detected by current detector 16 and gain G3, and outputs the result of the multiplication to adder 36. Adder 36 adds, to the inverter control command value generated by voltage controller 34, the output (Iac·G3) of gain calculator 42 as a feed-forward term.

Gain G3 is a gain for adjusting the magnitude of the feed-forward term, and may take a value larger than 0 and less than or equal to 1.0. In the case of G3=1.0, the feed-forward term is primary winding current Iac itself, and is equal to the feed-forward term in the comparative example in FIG. 2.

In contrast, in the case of 0<G3<1.0, the feed-forward term is smaller than primary winding current Iac, and is therefore smaller than the feed-forward term in the comparative example in FIG. 2.

Based on primary winding current Iac detected by current detector 16, biased-magnetization suppression unit 44 sets the value of gain G3 to be used by gain calculator 42. As described in the following, when exciting inrush current superimposed on primary winding current Iac is detected, biased-magnetization suppression unit 44 sets gain G3 to a value smaller than 1.0 to thereby reduce the feed-forward term.

Figure 4:
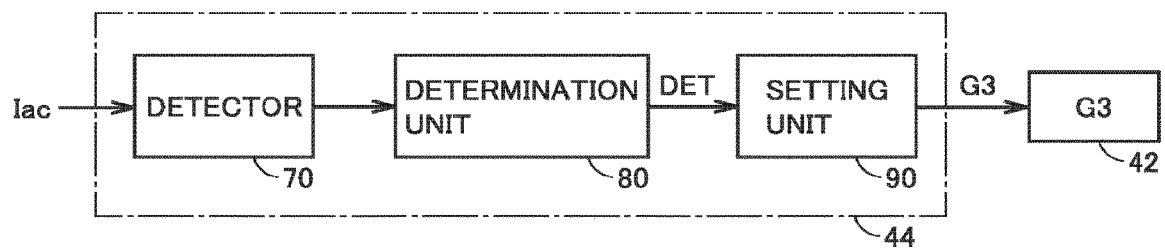
FIG. 4 is a functional block diagram showing a configuration of a biased magnetization suppression unit shown in FIG. 3.

FIG. 4 is a functional block diagram showing a configuration of biased-magnetization suppression unit 44 shown in FIG. 3. Referring to FIG. 4, biased-magnetization suppression unit 44 includes a detector 70, a determination unit 80, and a setting unit 90. Detector 70 extracts exciting current superimposed on primary winding current Iac detected by current detector 16.

Based on the magnitude of the exciting current extracted by detector 70, determination unit 80 determines whether exciting inrush current has been generated or not. When determination unit 80 determines that the detected value of primary winding current Iac includes the exciting inrush current, determination unit 80 outputs signal DET activated to H level as a signal indicating the result of the determination. H level signal DET indicates that DC-biased magnetization has occurred to transformer 3.

In contrast, when determination unit 80 determines that the detected value of primary winding current Iac does not include the exciting inrush current, determination unit 80 outputs signal DET inactivated to L level as a signal representing the result of the determination. L level signal DET indicates that DC-biased magnetization has not occurred to transformer 3.

In accordance with output signal DET from determination unit 80, setting unit 90 sets the value of gain G3. When setting unit 90 receives signal DET of L level, setting unit 90 sets the value of gain G3 to "1.0" (G3=1.0). In contrast, when setting unit 90 receives signal DET of H level, setting unit 90 sets the value of gain G3 to predetermined value K (G3=K). Predetermined value K is a value larger than 0 and smaller than 1.0 (0<K<1.0). Setting unit 90 outputs the set gain G3 to gain calculator 42. Gain calculator 42 multiplies primary winding current Iac detected by current detector 16 and gain G3.

Figure 5:
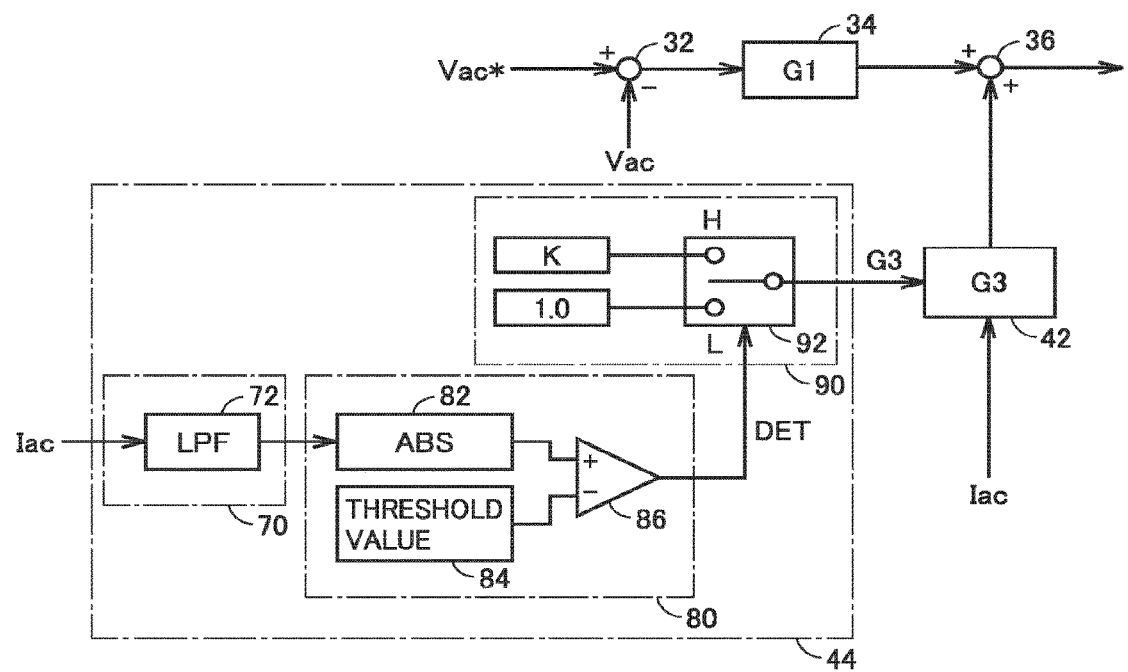
FIG. 5 is a circuit diagram showing an example configuration of the biased magnetization suppression unit shown in FIG. 4.

FIG. 5 is a circuit diagram showing an example configuration of biased-magnetization suppression unit 44 shown in FIG. 4.

Referring to FIG. 5, detector 70 includes a low-pass filter (LPF) 72. LPF 72 is configured to prevent passage of current IL of a desired frequency (commercial frequency for example) that is output from output filter 12, and pass exciting current of a frequency lower than the desired frequency. Namely, LPF 72 extracts exciting current from primary winding current Iac detected by current detector 16.

Determination unit 80 includes an absolute-value circuit (ABS) 82, a threshold value 84, and a comparator 86. Absolute-value circuit 82 calculates the absolute value of exciting current and outputs a signal representing the result of the calculation.

Comparator 86 compares the output signal of absolute-value circuit 82 with predetermined threshold value 84, and outputs a signal representing the result of the comparison.

Threshold value 84 is set in consideration of exciting inrush current flowing in primary winding 3a when magnetic saturation occurs to core 3c of transformer 3. When a peak value of the output signal (absolute value of exciting current) of absolute-value circuit 82 is larger than threshold value 84, comparator 86 outputs signal DET of H level. In contrast, when a peak value of the output signal (absolute value of exciting current) of absolute-value circuit 82 is smaller than threshold value 84, comparator 86 outputs signal DET of L level.

Setting unit 90 includes a switch 92. Switch 92 includes a first input terminal, a second input terminal, and an output terminal. The first input terminal receives predetermined value K and the second input terminal receives the value "1.0." Predetermined value K is a value larger than 0 and smaller than 1.0 (0<K<1.0) as described above.

Switch 92 selects one of the two input values based on output signal DET of comparator 86, and outputs the selected value as gain G3 from the output terminal. Specifically, when output signal DET of comparator 86 is H level, switch 92 selects predetermined value K. In contrast, when output signal DET of comparator 86 is L level, switch 92 selects the value "1.0."

Namely, when the peak value of the absolute value of exciting current included in the detected value of primary winding current Iac is larger than threshold value 84, it is determined that DC-biased magnetization has occurred to transformer 3 and gain G3 is set to predetermined value K (0<K<1.0). Accordingly, gain calculator 42 outputs, as a feed-forward term, a value determined by multiplying the detected value of primary winding current Iac by predetermined value K, i.e., a value corresponding to reduced primary winding current Iac. Then, when DC-biased magnetization occurs to transformer 3 at the time when power converter 100 is connected to transformer 3, the feed-forward term of voltage control unit 30 is reduced. The reduction of the feed-forward term deteriorates the quickness of response of the current control system to a sudden change of primary winding current Iac due to the exciting inrush current, and therefore, increase of exciting current can be suppressed and eventually increase of DC-biased magnetization can be prevented.

In contrast, when the peak value of the absolute value of exciting inrush current included in the detected value of primary winding current Iac is smaller than threshold value 84, it is determined that DC-biased magnetization has not occurred to transformer 3 and gain G3 is set to the value "1.0." In this case, gain calculator 42 outputs, as a feed-forward term, the detected value of primary winding current Iac obtained by current detector 16. Thus, the feed-forward term of voltage control unit 30 is maintained, and the quickness of response of the current control system to a sudden change of primary winding current Iac can be ensured.

Referring back to FIG. 3, controller 20 further includes a biased-magnetization detector 64 and a corrector 62. Biased-magnetization detector 64 has a similar function to the biased-magnetization detection circuit disclosed in PTL 1. Specifically, based on voltage Vac detected by voltage detector 18, biased-magnetization detector 64 detects DC component Vdc of a signal representing a magnetic flux generated in core 3c of transformer 3. Corrector 62 corrects inverter control command value Vinv* by adding a DC offset value to inverter control command value Vinv* so that DC component Vdc detected by biased-magnetization detector 64 is eliminated. PWM circuit 60 compares inverter control command value Vinv* corrected by corrector 62 with the carrier wave to thereby generate control signals G1 to G4.

Accordingly, after increase of exciting inrush current is suppressed by biased-magnetization suppression unit 44 upon connection of power converter 100, generation of DC-biased magnetization is suppressed by biased-magnetization detector 64. Therefore, even when the feed-forward term is set back to the original magnitude by biased-magnetization suppression unit 44 upon connection of power converter 100, DC-biased magnetization will not be generated. As a result, DC-biased magnetization of transformer 3 can be suppressed without affecting control in the normal condition.

Another Configuration Example

Regarding the above embodiment, the description is given of the configuration example where the value of gain G3 that determines the magnitude of the feed-forward term for voltage control unit 30 is switched between "1.0" and predetermined value K. In this configuration example, the stability of control may possibly be deteriorated when the magnitude of the feed-forward term is changed.

Figure 6:
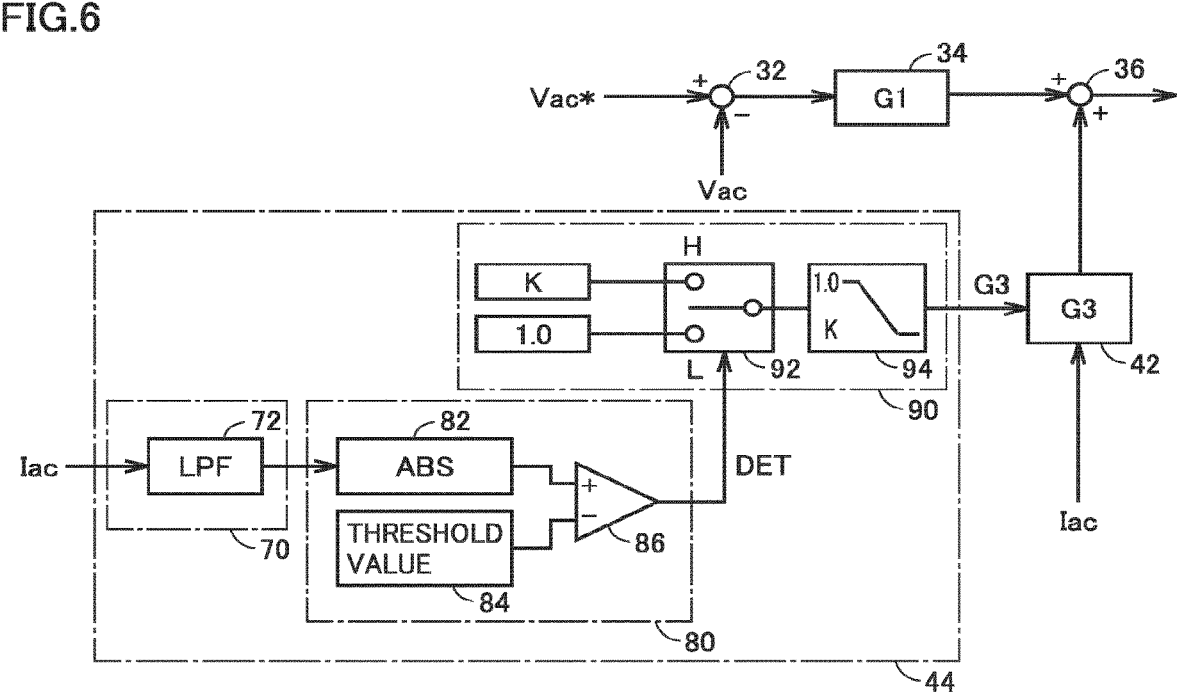
FIG. 6 is a circuit diagram showing another configuration example of the biased magnetization suppression unit shown in FIG. 4.

FIG. 6 is a circuit diagram showing another configuration example of biased-magnetization suppression unit 44 shown in FIG. 5. Referring to FIG. 6, biased-magnetization suppression unit 44 differs from biased-magnetization suppression unit 44 shown in FIG. 5 in terms of the configuration of setting unit 90. Setting unit 90 in this modification differs from the setting unit shown in FIG. 5 in that the former additionally includes a limiter 94.

Limiter 94 is disposed between switch 92 and gain calculator 42. Limiter 94 is configured to limit the rate of change of gain G3 when the value of gain G3 is switched from "1.0" to predetermined value K or the value of gain G3 is switched from predetermined value K to "1.0" by switch 92. The rate of change of gain G3 corresponds to the amount of change of gain G3 per unit time.

A predetermined rate of change is determined in accordance with the control response of current control unit 50. Then, when the value of gain G3 is switched, the value of gain G3 is changed in accordance with a predetermined rate of change, which ensures stability of control in current control unit 50.

It should be construed that embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST

1 DC power supply; 2a, 2b breaker; 3 transformer; 3a primary winding; 3b secondary winding; 3c core; 4 load; 10 inverter; 12 output filter; 14, 16 current detector; 18 voltage detector; 20, 200 controller; 30, 300 voltage control unit; 32, 52 subtractor; 34 voltage controller; 36, 38 adder; 40, 42 gain calculator; 44 biased-magnetization suppression unit; 50 current control unit; 54 voltage controller; 60 PWM circuit; 62 corrector; 64 biased-magnetization detector; 70 detector; 80 determination unit; 82 absolute-value circuit; 84 threshold value; 90 setting unit; 92 switch; 94 limiter; 100 power converter

The invention claimed is:

1. A power converter comprising:
an inverter that converts a DC voltage at a DC side to an AC voltage and outputs the AC voltage from an AC side, the AC side of the inverter being connected to a load via a transformer, the transformer supplying, to the load, the AC voltage that is output from the AC side;
a controller that controls the inverter;
a first current detector that detects primary winding current of the transformer;
a second current detector that detects output current of the inverter; and
a voltage detector that detects the AC voltage that is output from the AC side,
the controller including:
a voltage control unit that generates an AC current command value by adding a feed-forward term to a result of a control calculation that is performed for reducing a difference of a value of the AC voltage detected by the voltage detector, with respect to an AC voltage command value, the feed-forward term being determined by multiplying, by a gain, a value of the primary winding current detected by the first current detector;
a current control unit that generates an inverter control command value by a control calculation that is performed for reducing a difference of a value of the output current of the inverter detected by the second current detector, with respect to the AC current command value; and
a PWM circuit that performs PWM control of the inverter by comparing the inverter control command value with a predetermined carrier wave to generate a control signal for the inverter, wherein
when exciting inrush current is detected in a value of the primary winding current detected by the first current detector, the voltage control unit sets the gain smaller than the gain when the exciting inrush current is not detected.

2. The power converter according to claim 1, wherein
the voltage control unit detects whether the exciting inrush current is included in the value of the primary winding current detected by the first current detector, and
when the detected value of the primary winding current includes the exciting inrush current, the voltage control unit sets a value of the gain to a first value and,
when the detected value of the primary winding current does not include the exciting inrush current, the voltage control unit sets the value of the gain to a second value smaller than the first value.

3. The power converter according to claim 2, wherein
the first value is 1.0, and
the second value is larger than 0 and smaller than 1.0.

4. The power converter according to claim 1, wherein the voltage control unit includes a limiter that limits a rate of change of the feed-forward term when the gain is switched.

5. The power converter according to claim 1, wherein
the controller further includes:
a biased-magnetization detector that detects a DC component of a signal representing a magnetic flux generated in a core of the transformer, based on the value of the AC voltage detected by the voltage detector; and a corrector that corrects the inverter control command value to eliminate the DC component, and the PWM circuit generates the control signal for the inverter by comparing the inverter control command value corrected by the corrector with the predetermined carrier wave.

* * * * *